(12) United States Patent
Sloman (10) Patent No.: US 6,311,542 B1
(45) Date of Patent: Nov. 6, 2001

(54) MOULDING METHODS AND MOULDED ARTICLES

(75) Inventor: Roger Mark Sloman, Heanor (GB)

(73) Assignee: Advanced Composites Group Ltd., Derbyshire (GB)

( * ) Notice: Subject to any disclaimer, the term of this patent is extended or adjusted under 35 U.S.C. 154(b) by 0 days.

(21) Appl. No.: 09/380,531

(22) PCT Filed: Feb. 25, 1998

(86) PCT No.: PCT/GB98/00603

§ 371 Date: Aug. 26, 1999

§ 102(e) Date: Aug. 26, 1999

(87) PCT Pub. No.: WO98/38031

PCT Pub. Date: Sep. 3, 1998

(30) Foreign Application Priority Data

Feb. 27, 1997 (GB) .................................................. 9704108
May 1, 1997 (GB) .................................................. 9708960

(51) Int. Cl.$^7$ .................................................. G01M 7/00
(52) U.S. Cl. .................................................. 73/12.13; 156/245
(58) Field of Search .................................................. 73/12.01, 12.06, 73/12.09, 12.13; 156/242, 245

(56) References Cited

U.S. PATENT DOCUMENTS

| 2,602,037 | 7/1952 | Nelb . |
| 2,713,378 | 7/1955 | Nadler et al. . |
| 4,144,305 | * 3/1979 | Cottrell, Jr. et al. ................. 156/245 |
| 4,591,400 | * 5/1986 | Fradenburgh et al. ................ 156/80 |
| 5,304,269 | * 4/1994 | Jacaruso et al. ........................ 156/94 |
| 5,322,580 | * 6/1994 | McIntire et al. ...................... 156/148 |
| 5,390,534 | * 2/1995 | Feeney ...................................... 73/79 |
| 5,480,706 | 1/1996 | Li et al. . |
| 5,552,466 | * 9/1996 | Beckley et al. ....................... 524/265 |

FOREIGN PATENT DOCUMENTS 0 076 673 A    4/1918   (EP) .

* cited by examiner

Primary Examiner—Max Noori
(74) Attorney, Agent, or Firm—Adams, Schwartz & Evans, P.A.

(57) ABSTRACT

A method of molding a composite material which includes a fiber reinforcement within a resin comprises laying alternately on a mold first and second layers of fiber material pre-impregnated with uncured resin, where the resin content of the first layer is different from that of the second layer and the combination of layers gives the desired overall total volume fraction of fibers and resin in the laminate, enclosing the layers within an impervious membrane, evacuating the membrane and applying heat to the layers to flow gellate and at least partially cure the resin and during the process to allow released gasses and vapors to flow along the layers of lower resin content towards the membrane for subsequent evaluation.

19 Claims, 1 Drawing Sheet

MOULDING METHODS AND MOULDED ARTICLES

This application is a national stage application, according to Chapter II of the Patent Cooperation Treaty.

This is a filing of a national phase PCT application in the United States originating from PCT Application No. PCT/GB98/00603 filed Feb. 25, 1998 which claimed priority from United Kingdom Patent Application Nos. 97 04108.1 filed Feb. 27, 1997 and 97 08960.1 filed May 1, 1997.

The present invention relates to a method of moulding and to moulded articles, especially to a method of moulding and to articles moulded from a composite material comprising reinforcing filaments or fibres within a resin matrix.

There are currently many methods of moulding high performance fibre reinforced, resin based, composites all of which involve combining a liquid or semi-liquid or solid resin with a relatively stiff strong fibrous reinforcement. The combined materials can then be cured and converted into a consolidated structural composite article by the application of heat and pressure in a controlled process.

One convenient method of combining the resin and fibres is by pre-impregnation of a formulated resin, that is a resin and a hardener, in a controlled fibre array to form a sheet form (prepreg) which is easily handled and placed in a mould and has a suitable shelf life at ambient temperature. Typically sheets of prepreg are laid on to a shaped former and sealed within a tough membrane. The application of heat and pressure is then used to cause the resin to flow and the individual layers to coalesce and consolidate prior to gellation of the resin and the formation of the fully cured composite article suitable for high performance structural applications.

This is often achieved by the use of an autoclave, that is a pressure vessel in which prepregs are laid up on to a dimensionally accurate former or mould and are subject to pressures of typically 0.69 MPa (100 psi) and elevated temperatures between 120° and 200° C. Such conditions readily cause the prepreg layer to coalesce to form the moulded shape required. Sufficient pressure is applied to generate hydrostatic pressure within the resin mass causing reduction in size of internal voids, or to completely force them into solution. If pressure is maintained throughout gellation and cure a void free resin matrix is obtained. requiring high capital investment on equipment and high energy consumption during the cure process. Conventional prepregs require temperatures of 120–180° C. to effect cure. As a consequence of the combined high pressure and temperatures required, the mould tool materials must also be capable of withstanding such pressure without failure and to be dimensionally stable at the moulding temperature. Thus, for large components and applications involving small numbers of parts, tooling costs are inevitably very high compared to the overall cost of the manufactured components. It is clear, therefore, that conventional prepregs are unsuitable for certain applications (especially those that are cost sensitive) despite their good handling characteristics and high laminate performance. The use of an autoclave also places serious constraints on the size of components that can be made.

A cheaper alternative is vacuum bag processing, in which the laid up prepregs are placed on an impervious mould covered by an impermeable membrane sealed at its edges to the mould. The assembly is then evacuated and heated to a temperature typically between 120° C. and 180° C. The combination of atmospheric pressure and elevated temperature provides the conditions necessary to promote resin flow and coalesce individual layers together, whilst the elevated temperature results in the gellation and cure of the resin.

Conventional vacuum bag moulding is much cheaper than autoclave moulding but the moulded products are usually inferior in quality because of the occurrence of voids within the resin matrix. Typically the void level achieved by conventional vacuum bag moulding of normal prepegs exceeds 5% by volume, and the level may be very variable.

It has been proposed that an improved vacuum bag process for high temperature curing resins (120° C. or higher) utilises a semi-permeable membrane to assist extraction of entrapped air or volatiles prior to resin gellation. The semi-permeable membrane is placed in direct contact with the prepreg and vacuum is available over the total surface area of one side of any preformed assembly. This enables some extraction of entrapped volatiles through the thickness of the material, providing that such pathways exist in the particular architecture of the composite lay-up and the type of prepreg used. Moulding efficiency varies according to the complexity and thickness of the moulded article. It is recognized that when normal unidirectional prepreg is used there is very little or no through-the-thickness transmission of gaseous material. Additionally semi-porous membranes are not readily available and are expensive.

Another form of prepreg used currently is that identified in U.K. Patent No. 2108038 in which a concept and application for low temperature curing prepreg is identified (LTM). Such materials have been found to be of significant advantage for many applications including for aircraft prototyping and production items. In such applications the impact resistance or toughness of the laminate is an important property but the current types of LTM prepreg available are not satisfactory in this respect.

Furthermore, when used in a vacuum bag oven cured process, as is preferred for minimum cost manufacture, the existing prepregs do not reliably produce low void content laminates, values of 2–3% being common place, especially when unidirectional fibre constructions are required.

Another form of prepreg used is where the resin is not fully impregnated into the fibrous reinforcement. The dry portions of the fibrous reinforcement can then act as paths for the extraction of air and volatiles under vacuum prior to resin flow and gellation. However, this technique cannot be applied satisfactorily to purely unidirectional reinforcement, the form most desirable for high performance applications, such as aerospace structures. If the partial impregnation option is adopted for purely unidirectional material the resulting prepreg is of relatively poor quality and is prone to producing puckers or kinks in the fibre array which can degrade the mechanical properties obtained from the cured laminate.

The only method of applying the partial impregnation technique to unidirectional fibre arrays is to use stitching or chemical bonding to hold the fibres together, both of which are unsatisfactory for high performance, high quality aerospace applications. Apart from the effect of the stitching or bonding materials being incorporated into the layup, the bulk factor of the partially dry fibrous reinforcement leads to problems during layup which again affect the quality and performance of the resulting laminate and structure.

A high degree of resistance to impact (toughness) is critically important if the use of the moulded article is in applications such as aircraft structures. Achieving toughness in 120° C. and 180° C. curing resin formulations is difficult. Achieving similar levels of toughness in prepregs cured initially at temperatures less than 80° C. is even more difficult, due to the tendency of the toughening agents used to increase resin viscosity, and hence restrict resin flow.

Layers of prepreg laid on the former have, in certain instances in the past, been identical that is they include reinforcing filaments of fibres of the same type and resin of the same type. In certain exceptions to this arrangement the reinforcing filaments or fibres of some of the layers, for example each alternate layer, have differed from those of the other layers.

It has been considered inappropriate that the resin in each layer could be anything other than constant in composition, structure etc. throughout the arrangement of layers.

The result of this has been that the moulded article has had characteristics which are dependent on the one hand on the reinforcement and on the other, on the resin which is uniformly present throughout the article.

This is disadvantageous in certain circumstances. Different resin compositions can give different characteristics to the moulded article. For example certain resin compositions can provide toughness, others for example high temperature resistance, and others high mechanical performance. It has always been an objective of the prepreg resin formulator to provide a resin with the best possible characteristics in all these, and other respects. However, there are often conflicts in the requirements which lead to compromises being made and inferior properties compared to the ideal being accepted as a limitation of existing technology.

According to the present invention there is provided a method of moulding a composite material which includes a fibre reinforcement within a resin, comprising laying alternately on a mould first and second layers of fibre material pre-impregnated with uncured resin, the resin content of said first layers being substantially different from the resin content of said second layers, enclosing the laid up layers within a membrane, evacuating the membrane and applying heat to flow, gellate and at least partially cure the resin to harden the material.

Preferably the resin content of the first layer or layers differs from that of the second layer or layers in respect of the ratio of resin to fibre, with the ratio of resin to fibre of the first layer being greater than that of the second layer.

Alternatively the resin content of the first layer or layers differs from that of the second layer or layers in respect of the viscosity of the resin.

As a further alternative the resin content of the first layer or layers differs from that of the second layer or layers in respect of the composition of the resin, each resin composition being compatible with the other in the moulding operation and in use, but conferring different properties to the moulded laminate.

Further according to the present invention there is provided a method of moulding a composite material which includes a fibre reinforcement within a resin, comprising laying alternately on a mould first and second layers of fibre material pre-impregnated with uncured resin, the resin content of said first layers being substantially different from the resin content of said second layers, such that the combination gives the desired overall total volume fraction of fibres and resin in the laminate whilst allowing clear pathways via the lower resin content layers for the extraction of gaseous material through the edges of the laminate, enclosing the laid up layers within a membrane, evacuating the membrane and applying heat to flow, gellate and at least partially cure the resin to harden the material.

Further according to the present invention there is provided a method of moulding a composite material which includes a fibre reinforcement within a resin, comprising laying alternately on a mould first and second layers of fibre material pre-impregnated with uncured resin, the resin content of said first layers being substantially different from the resin content of said second layers, such that the combination gives the desired overall total volume fraction of fibres and resin in the laminate whilst providing in the cured material a combination of toughness, heat distortion temperature (H.D.T.) value and relevant mechanical properties which are more advantageous than that exhibited by the first and second layers individually, enclosing the laid up layers within a membrane, evacuating the membrane and applying heat to flow, gellate and at least partially cure the resin to harden the material.

Still further according to the present invention there is provided a method of moulding an article from a composite material which includes a fibre reinforcement within a resin, comprising laying alternately on a mould at least one first layer of a fibre material pre-impregnated with uncured resin and at least one second layer of fibre material pre-impregnated with an uncured resin the composition of which differs from the resin of the first layer and which is compatible in the moulding operation and in use with the first layer, the laid up layers being subjected thereafter to resin curing conditions.

Preferably the resin in each of the first and second layers is as fully impregnated into the fibre as is necessary to produce a layer which is handleable without distortion or resin transfer and amenable to laying up on the mould.

Preferably the material is partially cured at a temperature not exceeding 120° C. in one embodiment and not excluding 80° C. or 60° C. in another embodiment and may be removed from the mould and finally cured at an elevated temperature while unsupported by the mould. The further cure may be effected at the temperature required for the specific application involved.

Alternatively the required cure of the material is completed while supported on the mould.

Preferably high temperature stable thermoplastic resins either in solution in the resin or in the form of finely divided particles or other toughening agents are incorporated in the resin prior to placing the layers on the mould.

Preferably said high temperature stable thermoplastic resins or other toughening agents are added to the second layer. Alternatively or additionally they may be added to the first layer.

Examples of high temperature stable thermoplastic resins which can be chosen are polysulphones, polyether sulphones, polyetherimides, polycarbonates, polyethylene terepthialate, polyether-etherketone, polyimides, polyamides. Other high temperature stable thermoplastic resins or toughening agents may be employed.

Preferably the volume fraction of resin in the first layer is higher than that in the second layer.

Alternatively the volume fraction of resin in the first layer is substantially equal to the volume fraction of resin in the second layer.

Alternatively each of the first and second layers comprises a plurality of similar plies of resin impregnated fibre reinforcement.

Strips of unimpregnated fibre material may be added around the perimeter and/or on the top and bottom surface of the laminate and remain substantially resin free during curing to provide a passage for gasses therethrough and after curing or partial curing of the layers, on removal from the mould, the strips are removed, or the edge of the laminate is removed to remove the excess material from the article being produced.

Alternatively the strips of unimpregnated material may be laid up with any or all of the layers of the laminate as required.

Further according to the present invention there is provided a composite material article made by a method as set out in the preceding paragraphs.

A further aspect of the present invention provides a method of screening resin systems for their toughness properties by measuring loss in flexural modulus of composite material comprising impacting samples with a falling weight at a range of energy levels between 2 to 10 joules, adjusting said energy by changing the mass of the impact or whilst keeping the height and speed constant, measuring the flexural modulus before and after impact, producing graphs of loss of flexural modulus versus energy of impact and delamination damage area versus energy of impact.

Embodiments of the invention will now be described by way of example only with reference to the accompanying drawings in which.

Figure 1:
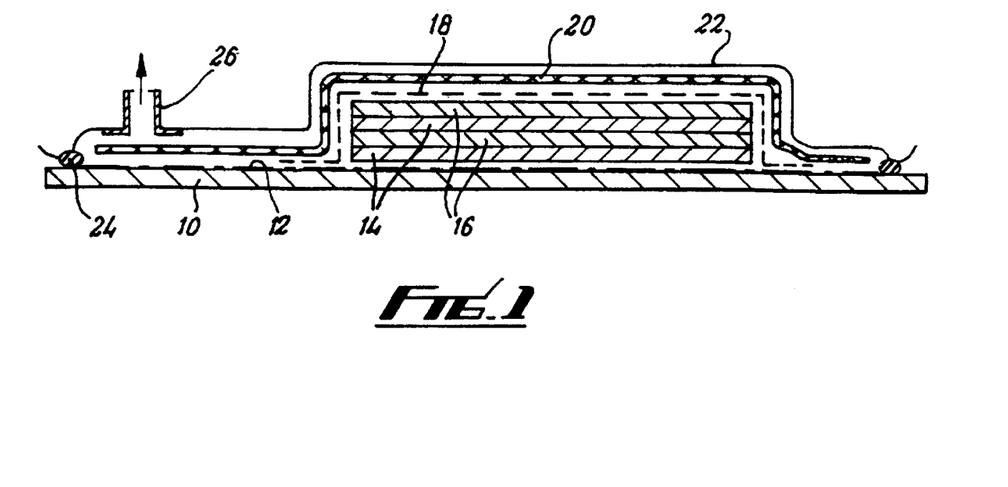
FIG. 1 illustrates diagrammatically a cross-section through a vacuum bag moulding apparatus and an article being moulded therein.

The mould, tool or former 10 in the embodiment described takes the form of an aluminum plate with a glass reinforced polytetrafluroethylene fabric sheet 12 bonded thereon. First and second sheets 14,16 of prepreg having respectively high and low resin content are arranged with their respective fibre axes either at right angles to each other or parallel to each other. Typically sixteen plies or layers (only four of which are shown in the diagram for clarity) are laid together to form a laminate article of 2 mm total thickness. The assembly of layers is overlaid with an appropriate releasing micro-porous membrane 18 which is porous and assists in the removal of air or volatiles released from the layers during the moulding process but is non-porous to liquid resins. This is subsequently covered by a heavyweight felt breather layer 20. The breather layer may be AIRBLEED 10 (Trade Mark) polyester felt available from AeroVac (Keighley) Limited. A nylon impermeable sheet 22 is then laid over the previously laid layers and attached at its edges to the mould 10 in air-tight manner using a proprietary tacky tape sealant 24, for example, SN5144 from AeroVac (Keighley) Limited. The sheet 22 is fitted with standard metal, through-the-bag vacuum sittings 26 so that a vacuum of up to 800 mm (28 ins) mercury can be applied to the void defined by the mould 10 and the impermeable membrane 22.

The surrounding temperature is then raised from room temperature to 60° C. at a rate of 0.5° C./min and maintained at 60° C. under full vacuum for 16 hours.

During this process any gases within the layers 14,16 of prepregs are released and can readily flow along the first layers having a low resin impregnation to the edges of the layers, into the breather felt, subsequently to be exhausted from the enclosure at sittings 26. Other volatiles and gases may, subject to the composition of the layers of prepreg, migrate through the resinous material, also to be removed from the enclosure. During application of heat and pressure the individual layers of prepreg coalesce and consolidate together prior to gellation of the resin mass. The removal of gases is substantially complete prior to gellation, thus the resulting composite laminate article contains a very low level of internal voids (less than 1% by volume).

In a modification the micro-porous membrane 18 can be replaced by a non-porous releasing membrane.

The moulded article is now partially cured and is removed from the mould after the enclosing layers have been stripped off. A post cure is then applied to the article when in a free-standing condition within an air circulating oven according to the following cycle. The post cure may not achieve full cure of the resin.

The temperature is raised from room temperature to 175° C.±5° C. at 20° C. per hour. The moulded article is then maintained at the high temperature for two hours. This converts the article to an essentially fully cured condition and produces a Glassy Transition Temperature greater than 180° C. if an appropriate prepreg resin formulation is selected.

In a further embodiment of the invention different resin formulations may be used in the second low resin content prepreg layers and the first high resin content prepreg layers to obtain other advantages, such as increased toughness or different expansion coefficient, or different secondary properties such as the dielectric constant or loss tangent.

Other resin content levels have also been found to perform satisfactorily ranging from the combination of 45% and 75% by volume fibre to 55% and 65% by volume fibre. Even other variations, and other combinations of different fibre volume materials are possible, and may be preferred in some applications.

This provides a method of achieving the high degree of resistance to impact (toughness) critically important for the use of the moulded article in applications such as aircraft structures. Achieving toughness in 120° C. and 180° C. curing resin formulations is difficult. Achieving similar levels of toughness in prepregs cured initially at temperatures less than 80° C. is even more difficult, due to the tendency of the toughening agents used to increase resin viscosity, and hence restrict resin flow.

EXAMPLE 1

Materials selected

1. TENAX HTA-5131 AKZ0 FASER AG, carbon fibre unidirectional tape—145 g/m$^2$ fibre weight Advanced Composite Group Ltd/(ACG Ltd)-LTM45EL low temperature curing epoxy resin at 22.7% W/W resin content (equivalent to 70% fibre volume fraction—NOMINAL).
2. TENAX HTA-5131 AKZ0 FASER AG carbon fibre unidirectional tape—145 g/m$^2$ fibre weight Advanced Composite Group Ltd/(ACG Ltd)-LTM43EL low temperature curing epoxy resin at 40.6% W/W resin content (equivalent to 50% fibre volume fraction—NOMINAL).

The dimension of each prepreg layer is 150×150 mm.

All plies laid with the fibre axis in the same direction and the high and low resin content prepregs were alternated as indicated below.

H=High resin content prepreg, L=Low resin content prepreg.

| 1 2 3 4 5 6 7 8 | 9 10 11 12 13 14 15 16 |
|---|---|
| H/L/H/L/H/L/H/L | L/H/L/H/L/H/L/H |

The preformed laminate was cured at 60° C. in accordance with the foregoing description as illustrated in FIG. 1 and postcured to 175° C.

The resultant voidage within the composite moulded article was measured by Image Analysis at 0.35% voidage by volume.

EXAMPLE 2

Materials selected

1. TENAX HTA-5131 AKZ0 FASER, AG carbon fibre unidirectional tape—145 g/m$^2$ fibre weight/ACG Ltd. LTM45EL low temperature curing epoxy resin at 27.0% W/W resin content (equivalent to 70% fibre volume fraction—NOMINAL).

2. TEN.AX HTA-5131 AKZ0 FASER AG, carbon fibre unidirectional tape—145 g/m² fibre weight/ACG Ltd. LTM45EL low temperature curing epoxy resin at 42.5% W/W resin content (equivalent to 48% fibre volume fraction—NOMINAL).

The dimension of each prepreg layer is 150×150 mm.

The plies were laid with alternating plies laid at 90° to the previous layer, to produce a composite laminate with a 0/90° construction.

Additionally the high and low resin content prepregs were alternated as indicated below.

H=High resin content prepreg, L=Low resin content prepreg.

| 1 2 3 4 5 6 7 8 | 9 10 11 12 13 14 15 16 |
|---|---|
| H/L/H/L/H/L/H/L | L/H/L/H/L/H/L/H |

The preformed laminate was cured at 60° C. in accordance with the foregoing description as illustrated in FIG. 1 and finally postcured at 175° C.

The resultant voidage within the composite moulded article was measured by Image Analysis at 0.30% voidage by volume.

EXAMPLE 3

In this example a large laminate was prepared with prepreg layers dimensioned 1220×1220 mm to demonstrate that the benefits produced by the invention are independent of size. The prepregs were selected, as in the previous examples 1 and 2 to have alternating high and low resin contents. The majority of the laminate comprised sixteen plies of prepreg in which the axis of the fibres was arranged alternately at 0° and 90° throughout in successive plies.

Figure 2:
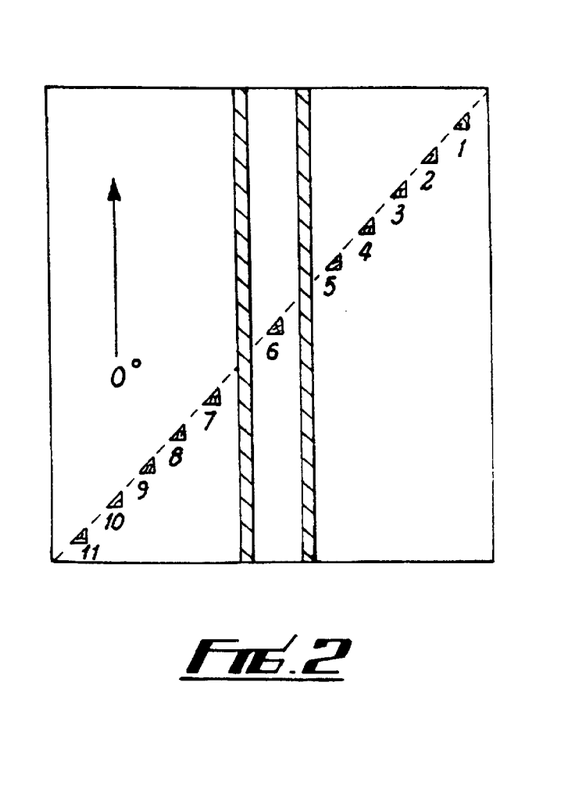
FIG. 2 is a schematic plan view of a laminate of an example of the invention.

A central thicker section was added to form a strip running centrally down the full length of the composite laminate. This central strip comprised 64 further alternating plies of high and low resin content prepreg arranged also in alternate 0° and 90° directions to each other. FIG. 2 shows a schematic plan view of this laminate as an aid to understanding.

Materials selected
1. TENAX HTA-5131 AKZ0 FASER AG, carbon fibre unidirectional tape—145g/m² fibre weight/ACG Ltd. LTM45EL low temperature curing epoxy resin at 40.6% W/W resin content (equivalent to 50% fibre volume fraction).
2. TENAX HTA-5131AKZ0 FASER AG, carbon fibre unidirectional tape—145g/m² fibre weight/ACG Ltd. LTM45EL low temperature curing epoxy resin at 22.7% W/W resin content (equivalent to 70% fibre volume fraction).

This laminate was prepared in accordance with the foregoing example as illustrated in FIG. 1, and cured at 60° C. Final postcure was completed at 175° C.

Eleven separate microsections were cut using a diamond edged rotary saw prior to potting in an acrylic resin medium and finally polished in preparation for microanalysis.

The individual void contents were determined by Image Analysis and are presented below. In all cases including the 80 layer central section, void content was found to be less than 1%.

| 1 | 2 | 3 | 4 | 5 | 6 | 7 | 8 | 9 | 10 | 11 |
|---|---|---|---|---|---|---|---|---|---|---|
| 0.35% | 0.87% | 0.47% | 0.12% | 0.30% | 0.63% | 0.42% | 0.15% | 0.27% | 0.63% | 0.52% |

Mean Value 0 0.43% voids

EXAMPLE 4

The embodiment of the present invention now to be described utilises
a) a high resin content first prepreg layer made with normal or relatively low viscosity resin which may be a normal 120° C. or 180° C. curing resin or an LTM prepreg resin formulation.
b) a low resin content second prepreg layer made with relatively highly toughened, high viscosity resin similar to conventional highly toughened 120° C. or 180° C. cure aircraft structural prepregs. This resin may also be a conventional high temperature curing resin or an LTM resin. With the correct selection of resin formulations and properties this construction was found to give the highly desirable characteristics of being both relatively tough compared to purely LTM based resin systems available currently and having a high Tg and hot/wet compression strength required in many aerospace and other high performance structural applications.

A further advantage of Example 4 is that the relatively high viscosity toughened resin in the second low resin content layers or plies will remain open to gasflow during the early stages of the moulding process, and this wil assist in removing all air, moisture, and other volatiles from the laminate as the temperature is increased. The void content of the resulting laminate is therefore milisnised and may often be reduced to substantially zero.

The viscosity values referred to in the preceding Example relate to viscosity values at the appropriate time during the material manufacturing and moulding stages of conversion from raw materials to finished product. It should be realised that the viscosities vary during the process. For example the viscosity during the impregnation process is preferably relatively low to allow good impregnation of resin into the fibre array. Elevated temperatures are often used With hot melt resin formulations, or solution coating may be employed. Viscosity will also alter during the exposure of the prepreg to storage and/or transportation conditions, or during its lay-up period, as well as during the laminate curing process prior to resin gellation.

EXAMPLE 5

A plurality of first and second sheets 14,16 of prepreg having the same volumetric resin content but differing but compatible resin compositions are arranged with their respective fibre axes either at right angles to each other or parallel to each other. Typically sixteen plies or layers are laid together to form a laminate article of 2 mm total thickness. The assembly of layers is overlaid with an appropriate releasing micro-porous membrane 18 which is porous and assists in the removal of air or volatiles released from the layers during the moulding process but is non-porous to liquid resins. This is subsequently covered by a heavy-weight felt breather layer 20. The breather layer may be AIRBLEED 10 (Trade Mark) polyester felt available from AeroVac (Keighley) Limited. A nylon impermeable sheet 22 is then laid over the previously laid layers and attached at its edges to the mould 10 in air-tight manner using a proprietary tacky tape sealant 24, for example, SN5144 from AeroVac (Keighley) Limited. The sheet 22 is fitted with standard metal, through-the-bag vacuum fittings 26 so that a vacuum of up to 800 mim (28 ins) mercury can be applied to the void defined by the mould 10 and the impermeable membrane 22.

The surounding temperature is then raised from room temperature to 60° C. at a rate of 0.5° C./min and maintained at 60 ° C. under full vacuum for 16 hours.

The moulded article is now partially cured and is removed from the mould after the enclosing layers have been stripped off. A second cure or postcure is then applied to the article when in a free-standing condition within an air circulating oven according to the following cycle.

The temperature is raised from room temperature to 175° C.±5° C. at 20° C. per hour. The moulded article is then maintained at the high temperature for two hours. This converts the article to a fully cured condition and produces a Heat Distortion Temperature (H.D.T.) greater than 180° C.

In a further modification the second low resin content layers are pre-impregnated with a high viscosity low curing temperature resin and the first high resin content lay ers are pre-impregnated with a low viscosity low curing temperature resin.

In following the moulding methods described above with reference to FIG. 1 a synergistic effect was found.

Another advantage is that the tougher resin formulation in the second low resin content prepreg layers can make it easier to handle at the relatively low resin contents used, than is the case with less viscous resins used in the other layers, or in normal LTML prepregs.

In a further modification of the invention, either the first layer or the second layer, or both may incorporate different reinforcing fibres by co-weaving, co-impregnating or co-mingling in order to increase the resistance of the laminate to impact, or to tailor the mechanical, physical, thermal, optical, electrical or other secondary characteristics to meet specific requirements. Furthermore, additives to the resin formulation can be used to modify the secondary properties appropriately.

Any form of fibrous reinforcement can be used in the method of the present invention but the most common are unidirectional, woven cloth, or stitched/bonded multiaxial fabrics. The fibre may comprise carbon, glass aramid or other fibre arrays in the form of unidirectional sheet or woven fabric form, needled felts, orientated discontinuous fibre tapes, intermingled hybrid fibre tows etc.

The methods are most useful with purely unidirectional prepreg, which is the form used most widely in aerospace applications, where the maximum mechanical performance is required. This is also the form with which it is most difficult to obtain void free laminates by vacuum bag moulding.

Cloth or unidirectional laminates can be made void free under vacuum bag processing by using a dry resin formulation which allows air to escape before the resin flows.

These exhibit certain drawbacks, for example, the laminates have no tack and poor drape unless heated during layup. Stitched/bonded unidirectional prepreg could be made partially impregnated and still remain handleable, albeit with a large bulkl factor.

The fibre layers may also be hybrid fibre layers prepared from intermingled tows comprising carbon and polyether etherketone (PEEK) fibres, or any other suitable thermoplastic polymer or toughening fibre.

The mould for use with the method of the present invention could be made from one or more of the following materials, wood, plaster, foamed resin, glass fibre. Any material which is castable, formable, machinable at room temperature may be utilised.

It is particularly desirable that the method is especially applicable for use with low temperature cure prepregs, and that it allows a convenient way of toughening such prepregs, which are currently inherently relatively poor in impact resistance.

Furthermore, other additives can be added to the resin formulation to appropriately modify its properties. The resin of either layer may include additional high temperature stable thermoplastic resins or rubber toughening agents either in solution in the resin or in the form of finely divided particles. Examples of high temperature stable thermoplastics resins which may be selected are polysulphones, polyether sulphones, polyetherimides, polycarbonates, polyethylene terepthalate, polyether etherketone, thermoplastic polyirides, polyamides, or any other suitable material.

In a still further modification the moulded article is made oversize and trimmed back to size after curing has taken place. In this modification strips of, for example, dry woven glass tape can be incorporated at the edges of the layup extending from the prepreg and the prepreg layup itself. These strips remain partially resin-free during resin flow so that they do not close up during cure thus leaving a flow path for gases released during cure. They are also useful for gripping the article when it is being removed from the mould in the initially semi-cured state. The article may be relatively fragile at this time and could otherwise suffer from careless handling.

In further modifications the unimpregnated strips are laid on the top and/or bottom surfaces of the article or, if the edges are to be trimmed off subsequent to removal from the mould, they may be laid interspaced with the first/second layers.

In a modification of the method described in Example 5 the first and second layer each comprises a plurality of plies each of which comprises a fibre material pre-impregnated with uncured resin. This gives effectively a composite article comprising two laminated components one of which comprises a plurality of first plies of similar composition and the other a plurality of second plies of similar composition.

A number of laminates made of different materials were produced using the methods described above to demonstrate the validity of the invention in terms of its ability to toughen relatively brittle LTM resin systems, whilst retaining their high Tg and good mechanical properties in hot/wet conditions. Various cure temperatures were used in both autoclave and vacuum bag/oven moulding processes, together with postcure conditions suitable for the resin systems used to produce either a controlled level of partial cure or complete cure.

The laminates were cut up into various samples for different tests as follows:

1) Barely Visible Impact Damage (BVID) Level Determination

A simple 20 mm diameter ball-nosed falling weight impact or was used to test the BVID level of the laminate samples, the onset of visible damage on the rear (non-impacted) face of the laminate being used as the test criterion in this case.

2) Flexural Modulus Before and After Impact (FMBAI)

A test method was used to demonstrate the validity of the toughening method described above.

In this test a simple 20 mm diameter ball-nosed falling weight is used to impact laminate samples supported by a plate with a 38 mm hole at a range of energy levels usually between 2 and 10 Joules, the energy being adjusted by changing the mass of the impact or, whilst keeping the height, and therefore the speed of the impact or, constant.

The flexural modulus of each test specimen (80×50 mm×2 mm) is measured before being impacted, and after impact. The loss in flexural modulus is a measure of the degree of damage caused. A graph of loss of flexural modulus versus energy of impact and delamination damage are then drawn from which various parameters can be measured.

A level of 20% loss of flexural modulus has been selected arbitrarily as a useful criterion to indicate relative levels of toughness in a laminate, and this has been found to have a reasonable correlation with the generally accepted Compression After Impact (CAI) test.

Another criterion obtained from the plot of modulus loss versus impact energy is the initiation of a rapid increase in modulus loss with increasing energy of impact which is used as an indication of relative toughness or resistance to intiation of significant damage in a fibre reinforced composite structure.

Brittle systems tend to show a steady rise in damage level with increasing energy of impact. Tough systems usually have a knee, or sharp increase in modulus loss with increasing impact energy at some point along the impact energy scale. Such systems have been shown to generally have a high threshold of resistance to low energy impacts, but at higher impact energy densities they behave very similarly to relatively untoughened systems.

3) Damage Area

The same test specimen and method is used as for the FMBAI test. However in this case the area of delamination damage visible on the rear face of the test piece is measured manually, and estimated. Again an arbitrary choice is made, using the energy to cause the visible damage area to extend to the circular edge of the supporting plate as the primary criterion.

4) Heat Distortion Temperature (HDT)

Conventional TMA measurements of the Glassy Transition Temperature (Tg) of the system were carried out to demonstrate that no reduction in effective Tg is apparent from this test. This is because the surface plies are the normal high Tg system, whilst the tougher, lower Tg system plies are beneath the surface plies.

This arrangement of the different materials is also important because the better overall retention of elevated temperature properties will lead to better structural properties under hot/wet conditions which is often a major design criterion for aerospace structures.

In this case a simple three point bend test is used to determine at what temperature the laminate starts to creep significantly under a static load. This point is indicated by the onset of a rapid change in deflection and is easily identified by plotting a graph of deflection against temperature.

5) Mechanical Properties

Short beam shear or interlaminar shear (ILSS), flexural strength (FS) and flexural modulus (FM) tests at ambient temperature, and then after 24 hr water boil were used to demonstrate the superior combination of properties obtained by using the method of the invention.

Those skilled in the art will recognise that increased levels of mechanical property retention under these conditions will be reflected in improved hot/wet compression properties, a critical design requirement for many aerospace or other high performance structural applications.

6) Void Content

The void contents of the laminates produced were determined by cutting specimens, potting them in casting resin, and then polishing the cut laminate edges to allow examination under a microscope equipped with an image analysis device to measure the void contents.

The following series of laminates were produced, all using Toray T800 carbon fibre. The cure and postcure times were varied as appropriate to achieve either partial or complete cure as appropriate.

| Prepreg Type & Fibre Volume Fraction (V/o) Laminate Condition | Laminate Number | Cure Method | | Cure Temperature (° C.) | | | Postcure Temperature (° C.) | | BVIDN (Joules) | | FMBAI 20% Loss (Joules) | |
|---|---|---|---|---|---|---|---|---|---|---|---|---|
| | | Auto-clave | Vac Bag | 60 | 80 | 120 | 120 | 175 | Postcure 120 | Postcure 175 | Postcure 120 | Postcure 175 |
| LTM45 EL AT 60 V/o FIBRE | 4097 | ✓ | | | | ✓ | | ✓ | | 0.64 | | 4.2 |
| | 4089 | ✓ | | ✓ | | | ✓ | | 0.70 | | 5.5 | |
| | 4052 | ✓ | | | | ✓ | NONE | | 0.75 | | 5.4 | |
| | 4077 | | ✓ | ✓ | | | | ✓ | | 0.45 | | 4.0 |
| | 4075 | | ✓ | | | ✓ | | ✓ | | 0.62 | | 4.0 |
| LTM45 EL/ EF0398D AT 60:60 V/o FIBRE | 4098 | ✓ | | | | ✓ | | ✓ | | 0.78 | | 5.3 |
| EF0398D AT 60 V/o FIBRE | 4096 | ✓ | | | | ✓ | | ✓ | | 0.77 | | 4.7 |
| | 4076 | | ✓ | | | ✓ | | ✓ | | 0.84 | | 4.4 |

-continued

| Prepreg Type & Fibre Volume Fraction (V/o) Condition | | LTM45 EL/EF0398D | | | | | 0.61 | 4.1 |
|---|---|---|---|---|---|---|---|---|
| LTM45 EL/ EF0398D 'ALLOY' At 60 V/o | 4095 | ✓ | ✓ | | ✓ | | 0.61 | 4.1 |

| | | | | | All After 175° C. Postcure Except Where Marked () | | | |
|---|---|---|---|---|---|---|---|---|
| Prepreg Type & Fibre Volume Fraction (V/o) Condition | FMBAI Knee Above 3 Joules (Joules) Postcure | | Energy At 1000 mm Damage Area (Joules) Postcure | | Void Content (%) | HDT (° C.) Wet (24 Hr) | | % of 21° C. Property Relation At Test Temperature After 24 Hour Water Boil Test Temperature |
| | 120 | 175 | 120 | 175 | | Dry | Boil | 120° C. H.SS | 21° C. FS | 21° C. FM |

| Prepreg Type | FMBAI 120 | FMBAI 175 | Energy 120 | Energy 175 | Void (%) | Dry | Boil | 120° H.SS | 21° FS | 21° FM |
|---|---|---|---|---|---|---|---|---|---|---|
| LTM45 EL AT 60 V/o FIBRE | NO NO NO | NO | 4.2 4.0 | 4.0 | ZERO 0.03 ZERO 0.90 2.45 | 188 (136) 197 183 180 | 145 (126) 133 132 128 | 63.4 (43.9) (53.7) 64.7 78.3 | 106.7 (87.5) (97.7) 110.5 101.6 | 105.1 (101.8) (90.0) 102.2 100.9 |
| | | NO NO | 4.0 3.2 | | | | | | | |
| LTM45 EL/ EF0398D AT 60:60 V/o FIBRE | 4.8 | | 4.8 | | 0.01 | 195 | 138 | 57.1 | 101.4 | 103.9 |
| EF0398D AT 60 V/o FIBRE | NO NO | NO | 3.9 | 5.7 0.10 | ZERO 177 | 193 123 | 110 53.5 | 53.4 85.5 | 87.5 110.9 | 96.3 |
| LTM45 EL/ EF0398D 'ALLOY' AT 60 V/o | NO | | | 3.8 | ZERO | 196 | 138 | 69.4 | 108.2 | 98.5 |

LTM45 EL/MTM 56 COMBINATION

| Prepreg Type & Fibre Volume Fraction (V/o) Condition | Laminate Number | Cure Method | | Cure Temperature (° C.) | | | Postcure Temperature (° C.) | | BVIDN (Joules) Postcure | | FMBAI 20% Loss (Joules) Postcure | |
|---|---|---|---|---|---|---|---|---|---|---|---|---|
| | | Auto- clave | Vac Bag | 60 | 80 | 120 | 120 | 175 | 120 | 175 | 120 | 175 |
| LTM45 EL AT 60 V/o FIBRE | 4097 | ✓ | | | | ✓ | | ✓ | | 0.64 | | 4.2 |
| | 4089 | ✓ | | ✓ | | | ✓ | | 0.70 | | 5.5 | |
| | 4052 | ✓ | | | | ✓ | NONE | | 0.75 | | 5.4 | |
| | 4077 | | ✓ | ✓ | | | | ✓ | | 0.45 | | 4.0 |
| | 4075 | | ✓ | | | ✓ | | ✓ | | 0.62 | | 4.0 |
| LTM45 EL/ MTM56 AT 60:60 V/o FIBRE | 4054 | ✓ | | | ✓ | | ✓ | | 0.86 | | 8.1 | |
| | 4050 | ✓ | | | | ✓ | NONE | | 0.94 | | 9.0 | |
| | 4061 | | ✓ | ✓ | | | ✓ | | 0.69 | | 7.3 | |
| | 4073 | | ✓ | | | ✓ | | ✓ | | 0.50 | | 6.5 |
| LTM45 EL/ MTM56 AT 50:70 V/o FIBRE | 4057 | ✓ | | ✓ | | | ✓ | | 0.88 | | 7.2 | |
| | 4013 | ✓ | | | | ✓ | NONE | | 0.79 | | 7.4 | |
| | 4062 | | ✓ | ✓ | | | ✓ | | 0.79 | | 6.3 | |
| | 4071 | | ✓ | | | ✓ | | ✓ | | 0.66 | | 5.9 |
| MTM 56 AT 60 V/o FIBRE | 4087 | ✓ | | ✓ | | | ✓ | | 0.85 | | 7.6 | |
| | 4084 | ✓ | | | | ✓ | | ✓ | | 0.83 | | 7.4 |
| | 4078 | | ✓ | ✓ | | | ✓ | | 0.52 | | 4.8 | |
| | 4074 | | ✓ | | | ✓ | | ✓ | | 0.83 | | 10.0 |
| LTM45 EL/ MTM56 'ALLOY' AT 60 V/o FIBRE | 4091 | ✓ | | ✓ | | | ✓ | | 0.64 | | 6.9 | |
| | 4079 | ✓ | | | | ✓ | | ✓ | | 0.62 | | 4.7 |
| | 4082 | | ✓ | ✓ | | | | ✓ | | 0.40 | | 3.9 |

-continued

LTM45 EL/MTM 56 COMBINATION

| Prepreg Type & Fibre Volume Fraction (V/o) Condition | FMBAI Knee Above 3 Joules (Joules) Postcure | | Energy At 1000 mm Damage Area (Joules) Postcure | | All After 175° C. Postcure Except Where Marked () | | | | % of 21° C. Property Relation At Test Temperature After 24 Hour Water Boil | | |
|---|---|---|---|---|---|---|---|---|---|---|---|
| | | | | | Void Content (%) | HDT (° C.) Wet (24 Hr) | | | Test Temperature | | |
| | | | | | | Dry | Boil | 120 H.SS | 21 FS | 21 FM |
| | 120 | 175 | 120 | 175 | | | | | | |
| LTM45 EL AT 60 V/o FIBRE | NO NO | NO | 4.2 4.0 | 4.0 | ZERO 0.03 ZERO | 188 (136) 197 | 145 (126) 133 | 63.4 (43.9) (53.7) | 106.7 (87.5) (97.7) | 105.1 (101.8) (90.0) |
| | | NO NO | | 4.0 3.2 | 0.90 2.45 | 183 180 | 132 128 | 64.7 78.3 | 110.5 101.6 | 102.2 100.9 |
| LTM45 EL/ MTM56 AT 60:60 V/o FIBRE | NO NO NO | NO | 4.9 5.4 5.1 | 4.8 | ZERO ZERO 0.105 0.46 | (138) (140) 184 (140) | (115) (130) 125 (104) | 22.1 21.4 27.6 25.8 | 100.4 — 91.1 93.8 | 97.7 — 81.7 101.8 |
| LTM45 EL/ MTM56 AT 50:70 V/o FIBRE | NO NO | NO | 5.3 4.1 7.2 | 4.8 | 0.005 ZERO 0.005 0.16 | 178 175 180 173 | 105 131 125 112 | (33.1) (34.5) (37.4) 49.2 | (98.0) 97.0 92.4 98.1 | (96.4) (92.7) (90.9) 106.8 |
| MTM 56 AT 60 V/o FIBRE | NO NO | 5.5 4.8 | 7.6 6.9 | 6.2 8.9 | 0.13 0.035 1.65 1.05 | 117 101 110 103 | 60 56 66 56 | 7.6 6.9 10.7 8.8 | 69.9 97.8 72.0 87.2 | 102.3 115.2 92.2 102.6 |
| LTM45 EL/ MTM56 'ALLOY' AT 60 V/o FIBRE | NO | NO NO | 3.9 4.2 3.2 | | ZERO 0.02 0.93 | (134) 165 170 | (105) 116 110 | (41.3) 51.2 60.3 | (98.8) 109.0 102.7 | (97.1) 103.3 105.7 |

LTM45 EL/EF 13697 COMBINATION

| Prepreg Type & Fibre Volume Fraction (V/o) Condition | Laminate Number | Cure Method | | Cure Temperature (° C.) | | | Postcure Temperature (° C.) | | BVIDN (Joules) Postcure | | FMBAI 20% Loss (Joules) Postcure | |
|---|---|---|---|---|---|---|---|---|---|---|---|---|
| | | Auto-clave | Vac Bag | 60 | 80 | 120 | 120 | 175 | 120 | 175 | 120 | 175 |
| LTM34 EL AT 60 V/o FIBRE | 4097 | ✓ | | | | ✓ | | ✓ | | 0.64 | | 4.2 |
| | 4089 | ✓ | | ✓ | | | ✓ | | 0.70 | | 5.5 | |
| | 4052 | ✓ | | | | ✓ | NONE | | 0.75 | | 5.4 | |
| | 4077 | | ✓ | ✓ | | | | ✓ | | 0.45 | | 4.0 |
| | 4075 | | ✓ | | ✓ | | | ✓ | | 0.62 | | 4.0 |
| LTM45 EL/ EF13697 AT 60:60 V/o FIBRE | 4053 | ✓ | | | ✓ | | | ✓ | | 0.76 | | 5.5 |
| | 4051 | ✓ | | | | ✓ | NONE | | 0.72 | 0.68 | 6.4 | |
| LTM45 EL/ EF 13697 AT 50:70 V/o FIBRE | 4056 | ✓ | | | ✓ | | | ✓ | | 0.83 | 0.77 | | 6.1 |
| | 4014 | ✓ | | | | ✓ | NONE | | 0.84 | 0.73 | 7.2 | |
| | 4060 | | ✓ | ✓ | | | | ✓ | | 0.61 | | 4.8 |
| | 4072 | | ✓ | | ✓ | | | ✓ | | 0.48 | | 5.5 |
| EF 13697 AT 60 V/o FIBRE | 4055 | ✓ | | | | ✓ | | ✓ | | 0.83 | | 5.2 |
| | 4049 | ✓ | | | | ✓ | NONE | | <0.24 | 0.75 | 2.1 | |
| LTM45 EL/ EF 13697 'ALLOY' AT 60 V/o FIBRE | 4090 | ✓ | | ✓ | | | ✓ | | 0.53 | | 6.0 | |
| | 4081 | ✓ | | | | ✓ | | ✓ | | 0.70 | | 4.8 |
| | 4083 | | ✓ | ✓ | | | | ✓ | | 0.80 | | 3.6 |

-continued

LTM45 EL/EF 13697 COMBINATION
All After 175° C. Postcure Except Where Marked ()

| Prepreg Type & Fibre Volume Fraction (V/o) Condition | FMBAI Knee Above 3 Joules (Joules) Postcure | | Energy At 1000 mm Damage Area (Joules) Postcure | | Void Content (%) | HDT (° C.) | | % of 21° C. Property Relation At Test Temperature After 24 Hour Water Boil | | |
|---|---|---|---|---|---|---|---|---|---|---|
| | | | | | | Wet | Test Temperature | | |
| | | | | | Dry | (24 Hr) Boil | 120° C. H.SS | 21° C. FS | 21° C. FM |
| | 120 | 175 | 120 | 175 | | | | | | |
| LTM34 EL AT 60 V/o FIBRE | NO NO | NO | 4.2 4.0 | 4.0 | 4.0 ZERO 0.03 ZERO | 188 (136) 197 | 145 (126) 133 | 63.4 (43.9) (53.7) | 106.7 (87.5) (97.2) | 105.1 (101.8) (90.0) |
| | | NO NO NO | | 4.0 3.2 4.1 | 0.90 2.45 ZERO | 183 180 180 | 132 128 137 | 64.7 78.3 69.2 | 110.5 101.6 96.9 | 102.2 100.9 92.9 |
| LTM45 EL/ EF13697 AT 60:60 V/o FIBRE | NO | | 4.0 | | 0.005 | (110) | (127) | (49.2) | (99.8) | (91.1) |
| LTM45 EL/ EF 13697 AT 50:70 V/o FIBRE | NO | NO NO NO | 4.1 | 4.4 3.6 4.0 | ZERO ZERO 0.10 0.22 | 178 (138) 159 179 | 145 (123) 149 146 | 64.9 (47.2) 72.9 72.8 | 86.6 (92.9) 100.0 99.4 | 95.8 (91.8) 97.8 96.9 |
| EF 13697 AT 60 V/o FIBRE | NO | NO | 1.8 | 5.7 | ZERO 0.01 | 179 Failed 84 | 133 (116) | 73.0 61.0 | 94.5 98.4 | 92.7 90.4 |
| LTM45 EL/ EF 13697 'ALLOY' AT 60 V/o FIBRE | NO | NO NO | 4.8 | 3.8 3.6 | 0.07 0.03 0.44 | (137) 210 190 | (117) 139 140 | 42.4 74.4 78.1 | 104.4 94.6 107.4 | 95.8 110.5 101.8 |

Analysis of the results given above demonstrates that laminates made using alternating plies of two different resin systems, one a relatively low viscosity high Tg resin, and the other a relatively high viscosity, heavily toughened, lower Tg resin, provide an advantageous combination of high HDT, good toughness, high hot/wet mechanical properties, and lower void contents (especially when using vacuum bag curing) than laminates made using either of the different materials on its own, or an "alloy" of the two different resins made by mixing them together to make a single prepreg type.

The lever of benefit is not just that which would be estimated from a simple "rule of mixtures" analysis based on the properties of the laminates made switch a single article.

A synergistic effect is demonstrated, where most of the desirable properties of each material are obtained, whilst the disadvantageous properties are almost eliminated or at least much reduced. For example:

a) The minced prepreg laminates are generally almost as tough (as shown by the test methods described above) as the tougher material at 100% and in some cases they give higher results than either of the individual materials on their own, or the "alloy".

b) The effective HDT of the laminate is almost as high as the Tg of the more temperature resistant material under the same postcure conditions.

c) The hot/wet mechanical properties are substantially higher than those of the lower HDT tough material and will generally be close to those of the 100% high temperature material.

d) The void content is lower than normal for vacuum bag laminates, even where the 60/60 volume % prepreg is used, although the 70/50 mixture gives a clear advantage in this respect under vacuum bag moulding conditions, showing essentially zero void levels, rather than the 2–3% often seen with this process using a single type of normal prepreg.

The results of the 'alloyed' resin systems demonstrate the advantages of using two different prepreg materials together, alternating the layers, as compared to the simple mixing of all the resin ingredients together to produce a single prepreg material. The 'alloying' approach merely compromises the properties which are desirable with those which are undesirable, giving a relatively poor result overall.

It will be realised that the simple alternating pattern of plies is not the only laminate design which will give the desirable combination of properties, particularly if the 60/60 volume fraction specification is used, or any other fibre resin volume in either of the plies which will independently of each other produce a good quality void free laminate under the moulding conditions used.

Double, or multiple plies of the higher Tg/lower toughness material on the outside of the laminate is likely to improve the HDT and hot/wet mechanical performance issues whilst the inner layers of the second/tougher prepreg will still impart higher toughness to the laminate without decreasing its Tg too much.

Similarly, the incorporation of alternative fibres into individual plies of the laminates may be used to provide specific secondary properties, such as reducing the radar cross-section of the laminate, or increasing its reflectivity to radiation or microwave energy.

Any combination of resins, fibres, additives etc which give a desirable combination of properties and/or processing advantages may be used.

Preferably the material combinations are initially cured under vacuum bag moulding conditions at 120° C. or less.

In many cases an initial cure temperature between 80° and 120° C. is desirable.

Further advantages are gained if the initial cure stage is carried out at a temperature between ambient (21° C. approx) and 60° C. as is known to those skilled in the art.

What is claimed is:

1. A method of moulding a composite material which includes a fibre reinforcement within a resin, characterised in that it comprises laying alternately on a mould first and second layers of fibre material pre-impregnated with uncured resin, the resin content of said first layers being substantially different from the resin content of said second layers, enclosing the laid up layers within a membrane, evacuating the membrane and applying heat to flow, gellate and at least partially cure the resin to harden the material.

2. A method according to claim 1 characterised in that the resin content of the first layer or layers differs from that of the second layer or layers in respect of the ratio of resin to fibre, with the ratio of resin to fibre of the first layer being greater than that of the second layer.

3. A method according to claim 1 characterised in that the resin content of the first layer or layers differs from that of the second layer or layers in respect of the viscosity of the resin.

4. A method according to claim 1 characterised in that the resin content of the first layer or layers differs from that of the second layer or layers in respect of the composition of the resin, each resin composition being compatible with the other in the moulding operation and in use.

5. A method of moulding a composite material which includes a fibre reinforcement within a resin, characterised in that it comprises laying alternately on a mould first and second layers of fibre material pre-impregnated with uncured resin, the resin content of said first layers being substantially different from the resin content of said second layers, such that the combination gives the desired overall total volume fraction of fibres and resin in the laminate whilst allowing clear pathways via the lower resin content layers for the extraction of gaseous material through the edges of the laminate, enclosing the laid up layers within a membrane, evacuating the membrane and applying heat to flow, gellate and at least partially cure the resin to harden the material.

6. A method of moulding a composite material which includes a fibre reinforcement within a resin, characterised in that it comprises laying alternately on a mould first and second layers of fibre material pre-impregnated with uncured resin, the resin content of said first layers being substantially different from the resin content of said second layers, such that the combination gives the desired overall total volume fraction of fibres and resin in the laminate whilst providing in the cured material a combination of toughness, heat distortion temperature value and relevant mechanical properties which are more advantageous than that exhibited by the first and second layers individually, enclosing the laid up layers within a membrane, evacuating the membrane and applying heat to flow, gellate and at least partially cure the resin to harden the material.

7. A method of moulding an article from a composite material which includes a fibre reinforcement within a resin, characterised in that it comprises laying alternately on a mould at least one first layer of a fibre material pre-impregnated with uncured resin and at least one second layer of fibre material pre-impregnated with an uncured resin the composition of which differs from the resin of the first layer and which is compatible in the moulding operation and in use with the first layer, the laid up layers being subjected thereafter to resin curing conditions.

8. A method according to claim 7 characterised in that it the resin in each of the first and second layers is as fully impregnated into the fibre as is necessary to produce a layer which is handleable without fibre distortion or resin transfer and amenable to laying up on the mould.

9. A method according to claim 7 characterised in that the material is partially cured at a temperature not exceeding 120° C. or 80° C. or 60° C. and is removed from the mould and finally cured at an elevated temperature while unsupported by the mould.

10. A method according to claim 7 characterised in that high temperature stable thermoplastic resins either in soluton in the resin or in the form of finely divided particles are incorporated in the resin prior to placing the layers on the mould.

11. A method according to claim 10 characterised in that the high temperature stable thermoplastic resins are added to the second layers.

12. A method according to claim 10 characterised in that the high temperature stable thermoplastic resins are chosen from the group comprising polysulphones, polyether sulphones, polyetherimides, polycarbonates, polyethylene terepthalate, polyether-etherketone, polyimides, polyamides.

13. A method according to claim 7, characterised in that additional types of reinforcing fibres are added to the first, second or both layers.

14. A method according to claim 4, characterised in that the volume of resin in the first layer differs from the volume of resin in the second layer.

15. A method according to claim 4, characterised in that strips of unimpregnated fibre material are added around the perimeter of some of the layers and remain substantially resin free during curing to provide a passage for gasses therethrough and after curing or partially curing of the layers and removal from the mould, removing the strips.

16. A method of screening resin systems for their toughness properties by measuring loss in flexural modulus of a composite material made according to a method as claimed in claim 7 characterised in that it comprises impacting samples with a falling weight at a range of energy levels between 2 to 10 joules, adjusting said energy by changing the mass of the impact or whilst keeping the height and speed constant, measuring the flexural modulus before and after impact, producing graphs of loss of flexural modulus versus energy of impact and delamination of damage area versus energy of impact.

17. A method of screening resin systems for their toughness properties by measuring loss in flexural modulus of composite material comprising impacting samples with a falling weight at a range of energy levels between 2 to 10 joules, adjusting said energy by changing the mass of the impact or whilst keeping the height and speed constant, measuring the flexural modulus before and after impact, producing graphs of loss of flexural modulus versus energy of impact and delamination damage area versus energy of impact.

18. A method of measuring as claimed in claim 17 wherein a level of 20% loss of flexural modulus to indicate relative levels of toughness in a sample.

19. A method of measuring as claimed in claim 16, wherein the position of the initiation of a rapid increase in flexural modulus loss with increasing energy of impact is used as an indication of relative toughness, or resistance to initiation of significant damage in a fibre reinforced composite structure.

* * * * *

UNITED STATES PATENT AND TRADEMARK OFFICE
CERTIFICATE OF CORRECTION

PATENT NO. : 6,311,542 B1
DATED : November 6, 2001
INVENTOR(S) : Sloman, Roger Mark It is certified that error appears in the above-identified patent and that said Letters Patent is hereby corrected as shown below:

<u>Claims,</u>
Claims 8, 9, 10, 13 and 16 should be corrected, as follows:

8. A method according to claim 1 characterized in that it the resin in each of the first and second layers is as fully impregnated into the fibre as is necessary to produce a layer which is handleable without fibre distortion or resin transfer and amenable to laying up on the mould.

9. A method according to claim 1 characterized in that the material is partially cured at a temperature not exceeding 120 C. or 80 C. or 60 C. and is removed from the mould and finally cured at an elevated temperature while unsupported by the mould.

10. A method according to claim 1 characterized in that high temperature stable thermoplastic resins either in solution in the resin or in the form of finely divided particles are incorporated in the resin prior to placing the layers on the mould.

13. A method according to claim 1, characterized in that additional types of reinforcing fibres are added to the first, second or both layers.

16. A method of screening resin systems for their toughness properties by measuring loss in flexural modulus of a composite material made according to a method as claimed in claim 1, characterized in that it comprises impacting samples with a falling weight at a range of energy levels between 2 to 10 joules, adjusting said energy by changing the mass of the impact or whilst keeping the height and speed constant, measuring the flexural modulus before and after impact, producing graphs of loss of flexural modulus versus energy of impact and delamination of damage area versus energy of impact.

Signed and Sealed this

Sixteenth Day of April, 2002

*Attest:*

JAMES E. ROGAN
*Director of the United States Patent and Trademark Office*

*Attesting Officer*